United States Patent [19]
Karlsson et al.

[11] Patent Number: 5,209,209
[45] Date of Patent: May 11, 1993

[54] DEVICE AT INTAKE SYSTEMS FOR INTERNAL COMBUSTION ENGINES

[75] Inventors: Jan Karlsson, Västra Frölunda; Jan Dahlgren, Göteborg, both of Sweden

[73] Assignee: AB Volvo, Gothenburg, Sweden

[21] Appl. No.: 909,647

[22] Filed: Jul. 7, 1992

[51] Int. Cl.⁵ .................... F02M 25/07; F02M 23/08
[52] U.S. Cl. .................................. 123/568; 123/585
[58] Field of Search ............... 123/568, 569, 570, 585, 123/52 M

[56] References Cited

U.S. PATENT DOCUMENTS

| | | | |
|---|---|---|---|
| 2,720,196 | 10/1955 | Wolf | 123/568 |
| 4,031,867 | 6/1977 | Yasuda et al. | 123/568 X |
| 4,262,639 | 4/1981 | Motosugi et al. | 123/568 X |
| 4,304,210 | 12/1981 | Hayakawa | 123/568 X |
| 4,361,126 | 11/1982 | Knapp et al. | 123/585 |
| 4,367,719 | 1/1983 | Kimura et al. | 123/568 |
| 4,517,951 | 5/1985 | Otaka et al. | 123/568 X |
| 4,693,226 | 9/1987 | Choma | 123/568 |
| 4,867,109 | 9/1989 | Tezuka et al. | 123/568 X |
| 5,014,654 | 5/1991 | Ishibashi | 123/568 X |
| 5,046,475 | 9/1991 | Thompson | 123/585 |

FOREIGN PATENT DOCUMENTS 349846 7/1969 Sweden .
386713 8/1976 Sweden .
2191244 12/1987 United Kingdom .

Primary Examiner—Willis R. Wolfe
Attorney, Agent, or Firm—Merchant & Gould Smith, Edell, Welter & Schmidt

[57] ABSTRACT

A device at an intake system for internal combustion engines incorporating a return conduit (17) for exhaust gases between exhaust side and intake side, in said return conduit a valve (18) controlled by the engine speed, a connection flange (16) between engine block (10) and intake manifolds (14), said connection flange having through openings (14') for intake air to the cylinders (1-6), and an exhaust channel (17') arranged in the connection flange along the edge thereof, means for connecting the exhaust channel via said valve (18) to the engine exhaust side, said exhaust channel having branch conduits (20), communicating with the different through openings (14'). The connection flange is equipped with a further internal channel (19') extending along the exhaust channel (17'), but between this and the side of the connection flange (16) facing the intake manifolds (14), and which further channel (19') is connected to an outlet tube (11) forming part of the intake system before a throttle valve (12) provided therein for supply of air to the further channel (19').

6 Claims, 3 Drawing Sheets

DEVICE AT INTAKE SYSTEMS FOR INTERNAL COMBUSTION ENGINES

BACKGROUND OF THE INVENTION

The present invention refers to a device at an intake system for internal combustion engines having elongated inlet manifolds to the engine cylinders, and where a return conduit for exhaust gases is provided between the exhaust side and the intake side of the engine, said return conduit being provided with a valve controlled by the engine speed or the like, whereby a connection flange is provided between the engine block and the intake manifolds, said connection flange being equipped with through openings for intake air to the engine cylinders, and with an exhaust channel arranged along the edge portions of the connection flange in the flange material, which exhaust channel via said valve is connectable to the exhaust side of the engine and along its extension being equipped with branch conduits, which communicate with the different through openings.

Such return of hot exhaust gases to the intake side of the engine is desired for reducing the combustion speed of the engine at certain operation conditions in order hereby to reduce the exhaust emissions at prevailing operation conditions.

GB-A-2 191 244 relates to such an exhaust gas recirculation system, where a spacer or connection flange is provided between the inlet manifold and the cylinder head, said spacer having air/gas flow passages extending therethrough and distribution passages for recirculated exhaust gases surrounding said air/gas flow passages and having inlet ports to said passages, the exhaust gas flow being controlled by a valve.

As it is a desire to change to plastic material in the inlet mainfolds it is less convenient to lead in the exhaust gases directly into such plastic tubes and such tubes are furthermore subjected to a substantial ageing due to the heat they are subjected to at their connection to the engine wall.

Purpose and Most Essential Features of the Invention

The purpose of the present invention is to provide a device, which in a simple and efficient manner improves the distribution of the return of the exhaust gases and eliminates those problems thus that plastic tubes can be used without problems. This has been achieved by the features defined in claim 1.

DESCRIPTION OF THE DRAWINGS

Hereinafter the invention will be further elucidated with reference to an embodiment of the invention illustrated in the accompanying drawings.

DESCRIPTION OF EMBODIMENT

Figure 1:
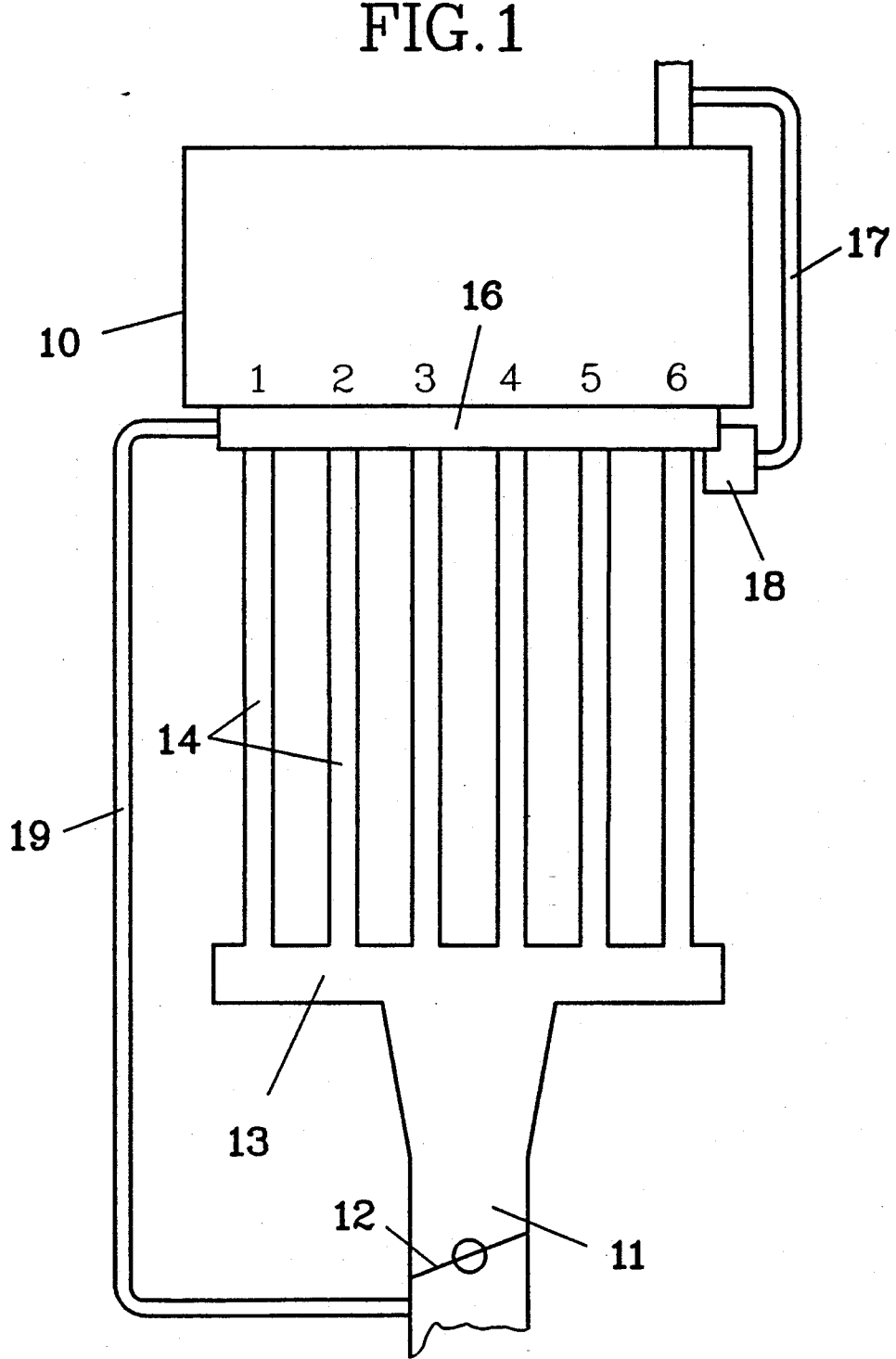
FIG. 1 shows schematically an intake system for a six cylinder internal combustion engine equipped with a device in accordance with the invention.

In FIG. 1 is schematically shown an intake system for a six cylinder internal combustion engine, where the six cylinders are intimated with numerals 1-6 in an engine block 10. The engine cylinders are supplied with air via an outlet pipe 11 from a not shown air filter, and the air from the outlet pipe, which is equipped with a throttle valve 12 is distributed in a header space 13. Elongated inlet manifolds 14 extend from this head space 13 to the engine block 10. The elongated inlet manifolds 14 are made from plastic material and are connected to the engine cylinders via a connection flange 16. By means of this connection flange, which is preferably produced in aluminum by pressure casting, the ends of the plastic tubes will be spaced somewhat from the hot engine block 10.

From the exhaust side of the engine is connected an exhaust conduit 17 to the connection flange 16 via a valve 18, which is controlled by the engine speed or by other engine parameters. An open air conduit 19 is further connected to the interior of the connection flange 16, and this air conduit has its opposite end connected to the outlet tube 11 before the valve 12. When the valve 12 is closed a maximum volume of air passes through the conduit 19 whereas the air flow in practice ceases when the valve 12 is completely opened.

Figure 2:
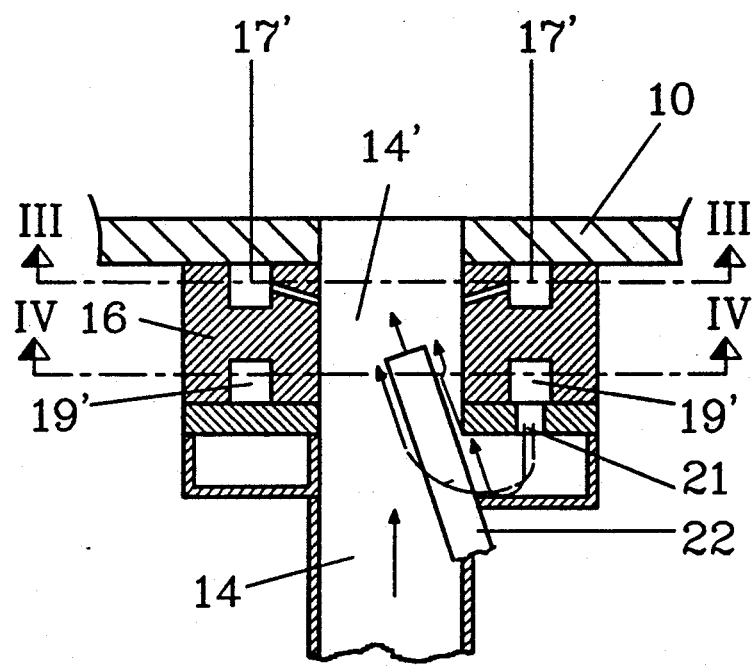
FIG. 2 is a cross section through a portion of the device according to FIG. 1.
Figure 3:
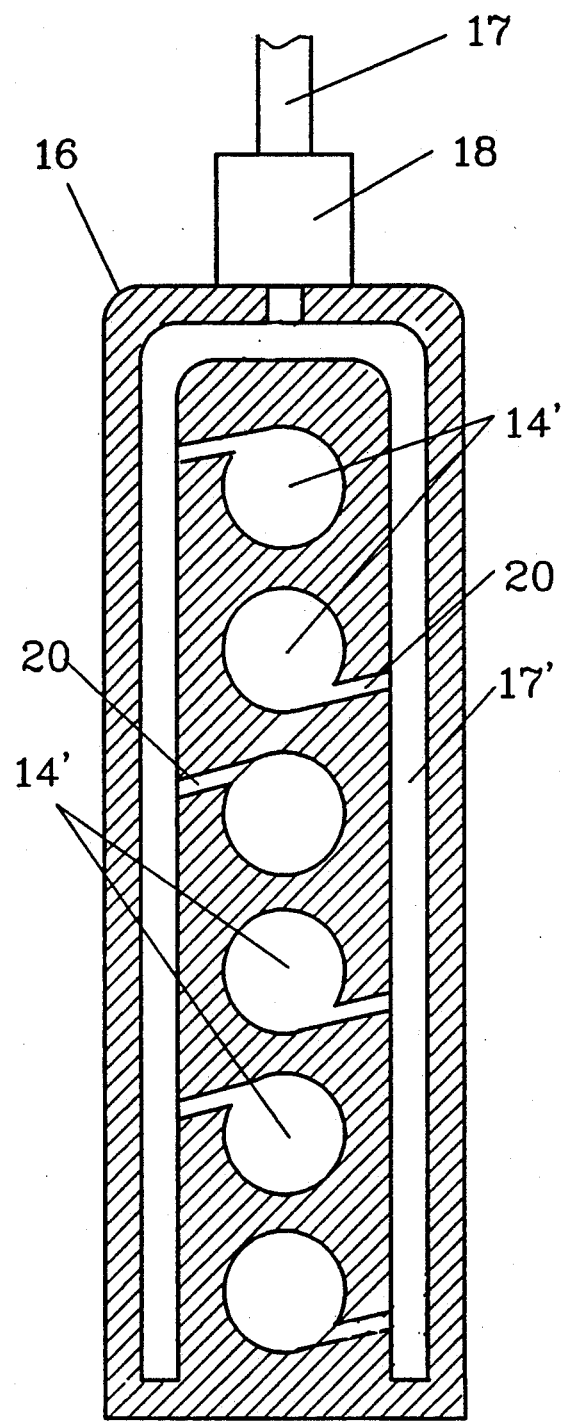
FIG. 3 shows a section along line III—III in FIG. 2.
Figure 4:
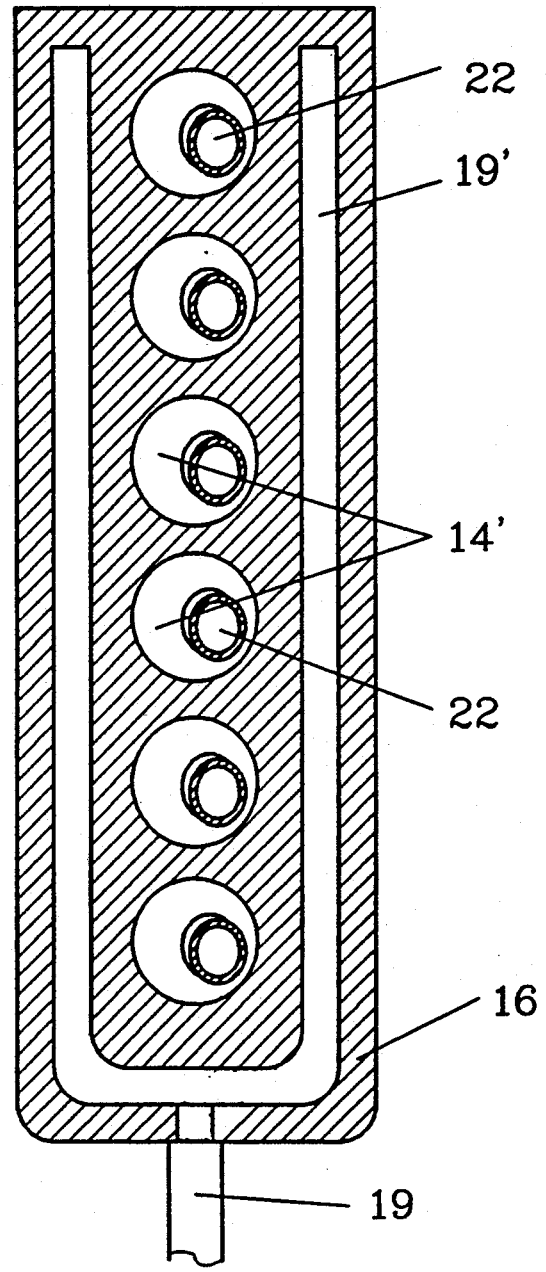
FIG. 4 is a section along line IV—IV in FIG. 2.

In FIG. 2 is shown the interior of the connection flange 16 in cross section and as can be seen the flange incorporates a number of internal channels 17' and 19', whereby the flange 16, which is penetrated by openings 14' for the intake air from the different intake manifolds 14 at the sides of these six openings 14', one of which is shown in FIG. 2, at each side of the row of openings has a mainly H-shaped cross section, whereby an exhaust gas channel 17' is arranged between the upper shanks of the H-profiles shown in the drawing, which exhaust channel via the valve 18 in FIG. 1, may be connected to the exhaust side of the engine. As shown in FIG. 3, which is a cross section along line III—III in FIG. 2, the exhaust channel 17' extends along the entire length of the flange and along three sides thereof, and it projects via branch conduits 20 into the openings 14'. The branch conduits 20 thereby are arranged alternately thus that the first branch conduit as seen in the direction of flow of the exhaust channel, will be connected to the second opening 14', the second branch conduit to the fourth opening etcetera, thus that the fifth and sixth branch conduits, as seen in the direction of flow, are connected to the third and to the first opening respectively. Hereby is obtained a good flow distribution of the exhaust gases into the intake opening, which means that the temperature in the engine can be increased at certain operating conditions.

In the space between the shanks of the H-profile, at the opposite side of the flange 16 there is provided in a corresponding manner an air channel 19', which however opens in a tube 21, thus that the air after having passed through a part of the channel 19', will flow around the injection nozzle 22, whereby the fuel can be pre-heated at operation conditions, which make this appropriate or desirable.

As can be seen from FIG. 2 the hot exhaust channel 19' is arranged in direct contact with the outside of the wall of the engine block 10, whereas the intake tube 14 as well as the air channel 19' are turned towards a less hot end wall 23, which closes the side of the connection flange facing away from the engine block.

Return of exhaust gases to the intake side of the engine will be accomplished in this manner, without the plastic tubes thereby being influenced by the heat from the exhaust gases, and at the same time is obtained a pre-heating of the portion of the intake air returned to the connection flange through the conduit 19, which intake air portion can be used to give a pre-heating of the fuel around the intake nozzle.

The invention is not limited to the embodiment shown in the drawing and described in connection thereto but modifications are possible within the scope of the following claims.

What we claim is:

1. A device at an intake system for internal combustion engines having a number of cylinders arranged in an engine block, and with elongated inlet manifolds to the engine cylinders, a return conduit for exhaust gases provided between the exhaust side and the intake side of the engine, said return conduit being provided with a valve controlled by an engine parameter, whereby a connection flange is provided between the engine block and the inlet manifolds, said connection flange being equipped with through openings for intake air to the engine cylinders, and with an exhaust channel arranged along the edge portions of the connection flange in the flange material, which exhaust channel via said valve is connectable to the exhaust side of the engine and along its extension being equipped with branch conduits, which communicate with the different through openings, characterized therein that the connection flange is equipped with a further internal channel having essentially the same extension as the exhaust channel, but which is situated between this exhaust channel and the side of the connection flange facing the intake manifolds, and which further channel is connected to an outlet tube forming part of the intake system before a throttle valve provided therein for supply of air to the further channel.

2. A device as claimed in claim 1,
characterized therein that the exhaust channel is situated adjacent the wall of the engine block, whereas the intake manifolds are connected to the connection flange at a distance from the exhaust channel.

3. A device as claimed in claim 2,
characterized therein that a separate gasket flange is provided between the exhaust channel and the engine block.

4. A device as claimed in claim 2,
characterized therein that the further channel is adapted to open in tubes surrounding injection pipes opening in the through openings for allowing air to flow around the injection pipes.

5. A device as claimed in claim 4,
characterized therein that the connection flange at both sides of its through openings has mainly H-shaped cross sections, where the space between the shanks of the H-profiles closest to the wall of the engine block forms said exhaust channel, and which space is closed by the engine block wall.

6. A device as claimed in claim 5,
characterized therein that the space between the shanks of the H-profiles facing away from the engine block is closed by an external partition and constitutes said air channel.

* * * * *